(No Model.)
H. M. DU BOIS.
VEHICLE WHEEL TIRE.
No. 411,791. Patented Oct. 1, 1889.
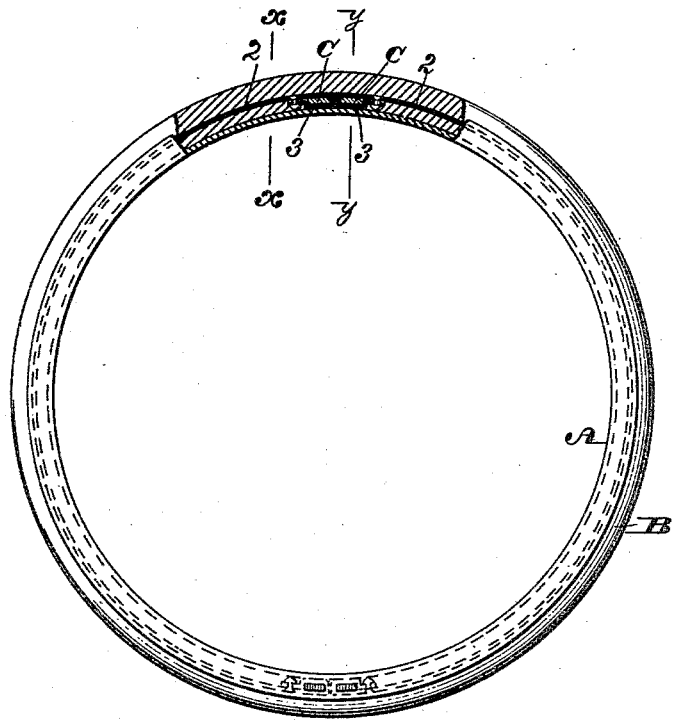
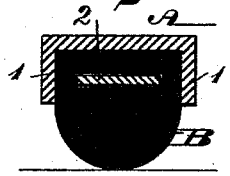
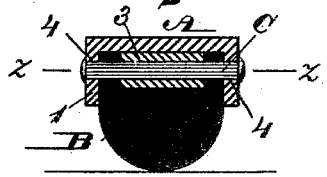
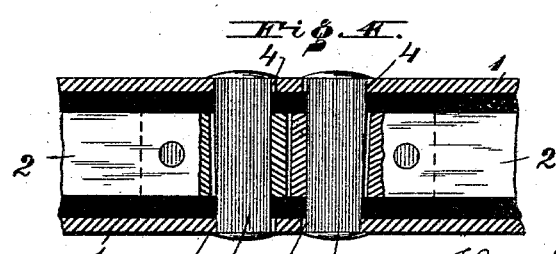
Witnesses
Thos. Rollé
A. P. Jennings
Inventor
Howard M. Du Bois
By his Attorneys

UNITED STATES PATENT OFFICE.

HOWARD M. DU BOIS, OF PHILADELPHIA, PENNSYLVANIA.

VEHICLE-WHEEL TIRE.

SPECIFICATION forming part of Letters Patent No. 411,791, dated October 1, 1889.

Application filed February 18, 1889. Serial No. 300,318. (No model.)

*To all whom it may concern:*

Be it known that I, HOWARD M. DU BOIS, a citizen of the United States, residing in the city and county of Philadelphia, State of Pennsylvania, have invented a new and useful Improvement in Vehicle-Tires, which improvement is fully set forth in the following specification and accompanying drawings.

My invention consists of a vehicle-tire formed of a channel and an elastic tread, said tread have inclosed or embedded within it a band, strap, or ring of metal or wood adapted to hold the tire firmly on the base of the channel.

It also consists of means for contracting the elastic tread, thereby firmly securing it to the tire.

Figure 1 represents a partial side elevation and partial longitudinal section of a vehicle-tire embodying my invention. Figs. 2 and 3 represent sections respectively on lines $x\ x$ and $y\ y$, Fig. 1, on enlarged scales. Fig. 4 represents a section on line $z\ z$, Fig. 3.

Similar letters and numerals of reference indicate corresponding parts in the several figures.

Referring to the drawings, A designates the tire of a vehicle-wheel, and B the tread thereof, said tire being formed of wood, iron, steel, or other suitable metal or material, with side flanges 1, producing a circumferential channel, into which the inner portion of the tread is received, said tread being made of soft rubber or other elastic material. Within the tread is a band, strap, or ring 2, of iron, wood, or the like, the same being formed in sections or segments, the ends whereof are provided with loops or eyes 3, produced by bending the metal or material, or in any other suitable manner. In the side flanges of the tire are slots or openings 4, which coincide in position with the loops 3 of the embedded or inclosed ring 2.

C designates keys or wedges, which are passed through the tire, the contiguous portions of the tread and the ring, through the openings 4, the loops 3, and openings in the tread, and headed or riveted on the flanges 1.

The operation of connecting the tread with the tire is as follows: The tread, with the ring therein, is stretched or distended, this being permitted, as the segments or sections of said ring are disconnected, the wedges or keys not yet having been applied. As soon as the diameter of the tread is sufficiently great said tread is slipped over either of the side flanges and dropped into the channel of the tire, the slots 4 and loops 3 being coincident, as has been stated. The keys are now passed through the tire, tread, and ring, and by their wedging action drawing the segments of the band toward each other, thus contracting the tread and tightening it on the tire. The ends of the keys are then hammered, headed, or riveted, whereby they are prevented from displacement, and the tread is reliably retained in compact and tight condition on the tire.

It is evident that the band, strap, or ring 2 may be made of a single piece with loops at the ends of the same, or a number of such pieces or segments, two of which are shown in the drawings.

I am aware that it is not new to construct a vehicle-tread of elastic material having within the same a band of metal or other suitable material, and to connect the said band with the tire; but I am not aware that it is common to construct the ends of sections of the band so inclosed with loops through which and the sides of the tire are passed keys for securing the band, and thereby the tread, in place.

Having thus described my invention, what I claim as new, and desire to secure by Letters Patent, is—

1. A tire for a vehicle, having an elastic tread with a sectional band within the same, the ends of the sections having loops and the sides of the tire having coincident openings, and keys passing through loops and openings, said parts being combined substantially as described.

2. In a vehicle-tire, an elastic tread having a strap, band, or ring of metal or other material within the same, and keys which are passed through the tire proper and the ends of said band, substantially as described.

3. An elastic tread having a ring inclosed or embedded therein, the ends of said band being provided with loops to receive keys, whereby said ends may be brought together and the tread contracted, substantially as described.

4. A channeled tire and an elastic tread, in combination with a ring inclosed or embedded in said tread, and keys passing through the tire, the tread, and the ends of said ring, whereby the tread may be firmly held on the tire, the parts named being combined substantially as described.

HOWARD M. DU BOIS.

Witnesses:
JOHN A. WIEDERSHEIM,
A. P. JENNINGS.